United States Patent
Oishi

(10) Patent No.: US 8,392,716 B2
(45) Date of Patent: Mar. 5, 2013

(54) COMMUNICATION APPARATUS, DIGITAL SIGNATURE ISSUANCE METHOD AND APPARATUS, AND DIGITAL SIGNATURE TRANSMISSION METHOD

(75) Inventor: Kazuomi Oishi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1958 days.

(21) Appl. No.: 11/038,176

(22) Filed: Jan. 21, 2005

(65) Prior Publication Data
US 2005/0160273 A1 Jul. 21, 2005

(30) Foreign Application Priority Data
Jan. 21, 2004 (JP) .................................. 2004-013093

(51) Int. Cl.
*H04L 9/32* (2006.01)

(52) U.S. Cl. ........ 713/180; 713/153; 713/155; 713/156; 713/157; 713/162; 713/169; 713/171; 713/173; 713/175; 713/176; 713/150; 713/168; 713/170; 713/181; 380/255; 380/259; 380/30; 380/285; 380/277; 380/278; 709/227; 709/228; 709/229

(58) Field of Classification Search .......... 713/175–176, 713/180–181, 153, 155–157, 162, 171, 173, 713/150, 168–170; 380/255, 259, 30, 285, 380/277, 278; 709/227–229
See application file for complete search history.

(56) References Cited

U.S. PATENT DOCUMENTS

| | | | |
|---|---|---|---|
| 5,046,094 A | | 9/1991 | Kawamura et al. .............. 380/46 |
| 5,369,708 A | | 11/1994 | Kawamura et al. .............. 380/30 |
| 5,668,878 A | * | 9/1997 | Brands ............................. 380/30 |
| 5,696,827 A | * | 12/1997 | Brands ............................. 380/30 |
| 6,408,388 B1 | | 6/2002 | Fischer ........................... 713/176 |
| 6,510,513 B1 | | 1/2003 | Danieli ........................... 713/156 |
| 7,032,242 B1 | * | 4/2006 | Grabelsky et al. .............. 726/11 |
| 2002/0025046 A1 | | 2/2002 | Lin ................................. 380/282 |
| 2002/0141594 A1 | * | 10/2002 | MacKenzie et al. ........... 380/286 |
| 2003/0093678 A1 | * | 5/2003 | Bowe et al. ..................... 713/180 |
| 2003/0145227 A1 | * | 7/2003 | Boden ............................ 713/201 |

(Continued)

FOREIGN PATENT DOCUMENTS

| | | |
|---|---|---|
| EP | 0 982 896 A2 | 8/1999 |
| JP | 2003-179592 | 6/2003 |

(Continued)

OTHER PUBLICATIONS

T. Matsumoto, et al., "Smart Cards can Compute Secret Heavy Functions with Powerful Terminals," the 10$^{th}$ Symposium on Information Theory and Its Applications, Enoshima Islands, Japan, Nov. 19-21, 1987, p. 17-22. (with English translation).

(Continued)

*Primary Examiner* — Christopher J Brown
*Assistant Examiner* — Canh Le
(74) *Attorney, Agent, or Firm* — Fitzpatrick, Cella, Harper & Scinto

(57) ABSTRACT

An initiator shares y_ir with a responder, calculates HASH_I on the basis of y_ir, and sends HASH_I to an IKE proxy server. The initiator receives a digital signature SIG_S generated for HASH_I and the address of the initiator from the IKE proxy server and sends the digital signature SIG_S to the responder.

14 Claims, 9 Drawing Sheets

U.S. PATENT DOCUMENTS

| | | | |
|---|---|---|---|
| 2003/0161472 A1* | 8/2003 | Tong et al. | 380/270 |
| 2003/0191963 A1* | 10/2003 | Balissat et al. | 713/201 |
| 2003/0212892 A1 | 11/2003 | Oishi | |
| 2004/0093492 A1* | 5/2004 | Daude et al. | 713/156 |
| 2005/0005097 A1* | 1/2005 | Murakawa | 713/156 |

FOREIGN PATENT DOCUMENTS

| | | |
|---|---|---|
| JP | 2004-15773 | 1/2004 |

OTHER PUBLICATIONS

T. Matsumoto, et al., "Speeding Up Secret Computations With Insecure Auxiliary Devices," Advances in Cryptology—CRYPTO '88, Springer-Verlag, 1988, p. 497-506.

N. Koblitz, "A Course in Number Theory and Cryptography, $2^{nd}$ Edition", Springer-Verlag, 1994, p. 167-170.

J. Dankers, et al., "Public Key Infrastructure in Mobile Systems", IEE Electronics and Communication Engineering Journal, 2002, vol. 14, Issue 5, pp. 180-190.

D. Harkins, et al., "The Internet Key Exchange" (IKE), The Internet Society (Request for Comments: 2409), 1998.

D. Piper, "The Internet IP Security Domain of Interpretation for ISAKMP", The Internet Society (Request for Comments: 2407), 1998.

* cited by examiner

US 8,392,716 B2

COMMUNICATION APPARATUS, DIGITAL SIGNATURE ISSUANCE METHOD AND APPARATUS, AND DIGITAL SIGNATURE TRANSMISSION METHOD

FIELD OF THE INVENTION

The present invention relates to a digital signature issuance method and apparatus and a digital signature transmission method.

BACKGROUND OF THE INVENTION

IPsec is a protocol by which two apparatuses on the Internet sharing secret data unknown to anybody else perform encryption and authentication on the basis of this secret data. To communicate with each other, these two apparatuses must securely share the secret data, their IP addresses, and the like. Data such as the secret data and IP addresses is called SA (Security Association).

A protocol by which SA is safely shared is called IKE (Internet Key Exchange), and defined in RFC2409 "The Internet Key Exchange (IKE)". IKE uses a Diffie-Hellman public-key distribution scheme (to be referred to as DH hereinafter) as a secret data sharing method, and four authentication methods are defined. One of them uses a pre-shared key and is not suitable for communicating with many unspecified communication partners. The remaining three authentication methods use a public key cryptography. Since a public key is a random-looking numerical value, a public-key certificate is used to certify the correspondence between a public key and an apparatus.

That is, to execute IPsec with many unspecified communication partners on the Internet using IKE, a public-key certificate must be issued to an apparatus. A private key corresponding to a public key or a key generated by performing IKE needs to be securely generated and managed such that only the apparatus can use the key.

As a method of overcoming constraints on computing performance and storage capacity, there can be considered a method of providing a server which performs IKE by proxy. For example, Japanese Patent Laid-Open No. 2003-179592 describes a method by which a key exchange proxy server performs DH and authentication by proxy. However, in this method, two keys, i.e., a key generated by performing IKE and a private key required to generate a signature payload are known to the key exchange proxy server. That is, a key is not generated and managed such that only an apparatus can use the key.

Currently known methods are as follows. In one method, an apparatus completely supports and independently performs certificate processing and IKE such that a key is unknown to others. In another method, a second apparatus is allowed to know a key and performs certificate and IKE processing by proxy. A method in which an apparatus does not perform processing independently, and a second apparatus performs processing by proxy without knowing a key would make it possible to manufacture an apparatus at lower cost than an existing one and would be preferable in terms of security. However, such method is unknown at the present.

It is difficult for some apparatuses which perform communications on the Internet to perform complicated operation and strict management. These apparatuses do not always have high computing performance and large storage capacity.

SUMMARY OF THE INVENTION

It is an object of the present invention to use a public key cryptography without strict management.

It is another object of the present invention to allow an apparatus which has poor computing performance and is not under strict management to share secret data and use a digital signature.

It is still another object of the present invention is to prevent impersonation.

It is still another object of the present invention is to provide a communication apparatus comprising generation means for generating data and communication means for sending the generated data to a digital signature issuance apparatus, wherein the communication means receives a digital signature issued by the digital signature issuance apparatus for the generated data and an address used by the communication means and sends the issued digital signature to a communication partner.

It is still another object of the present invention is to provide a digital signature issuance method comprising receiving data from a second apparatus which perform cryptographic communication with a first apparatus, generating, using a private key, a digital signature for the received data and an address used by the second apparatus, and sending a certificate of a public key corresponding to the private key and the generated digital signature to the second apparatus.

It is still another object of the present invention is to provide a transmission method comprising sharing secret data with a communication partner, calculating a hash value on the basis of the secret data, sending the hash value to a digital signature issuance apparatus, receiving a digital signature generated for the hash value and an address of the communication apparatus from the digital signature issuance apparatus, and sending the digital signature to the communication partner.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 2:
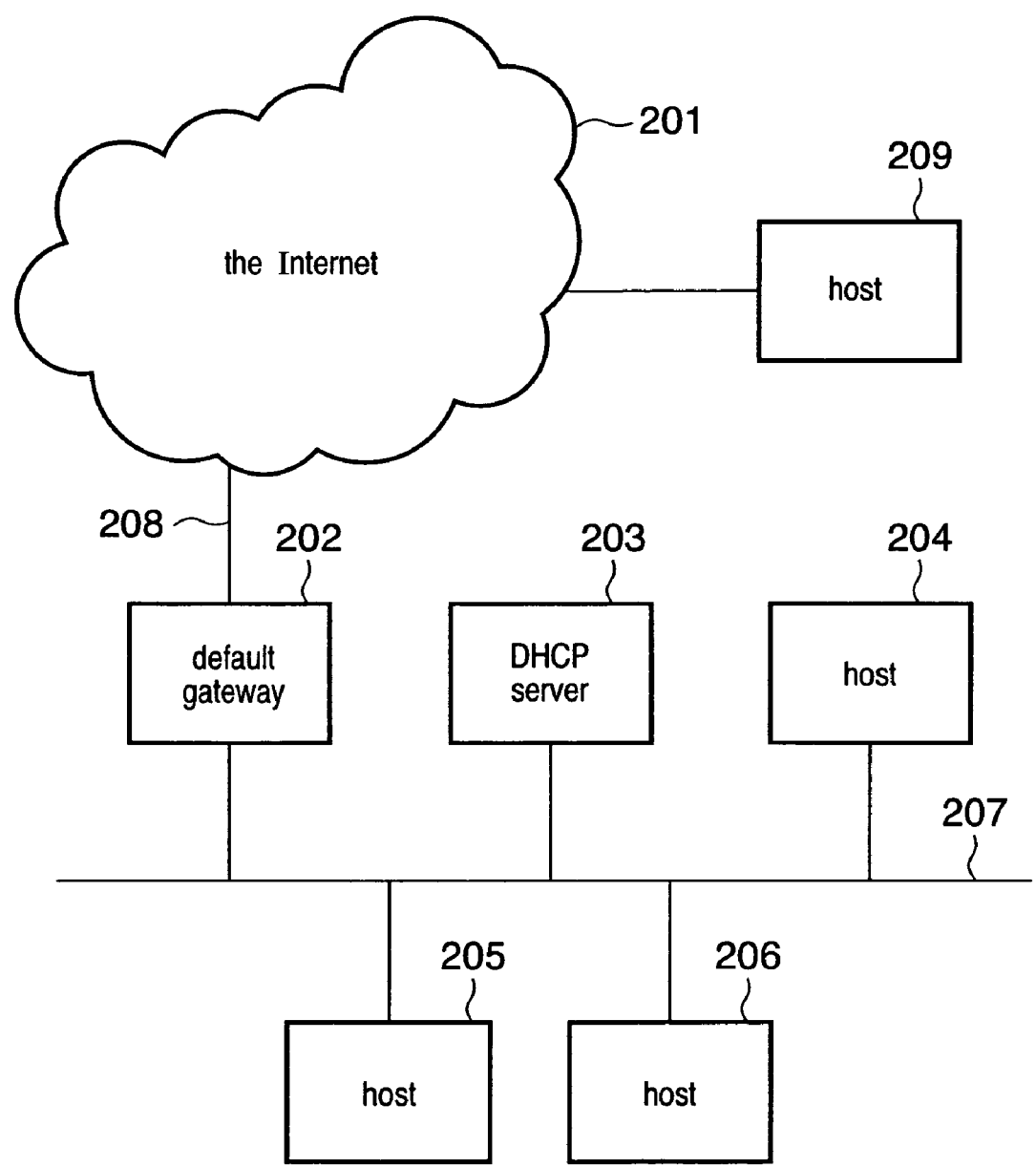
FIG. 2 is a schematic diagram showing an Ethernet (registered trademark) LAN.
Figure 3:
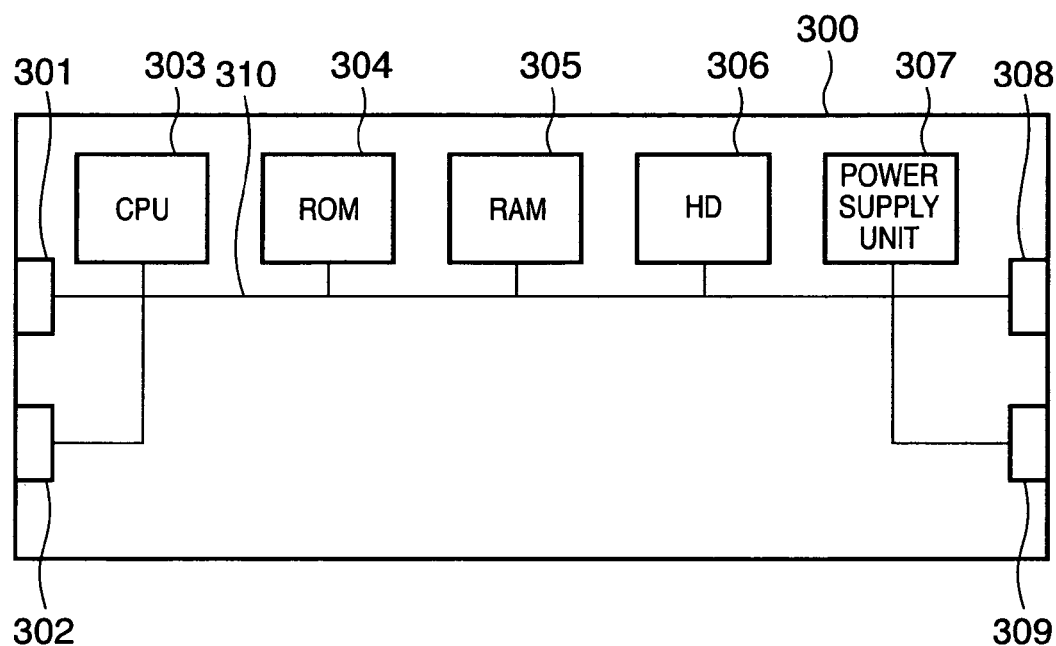
FIG. 3 is a diagram showing the arrangement of a node.

The first embodiment of the present invention will be described. The connection environment (FIG. 2) and the arrangement of an apparatus (FIG. 3) of this embodiment are the same as those in the second embodiment. FIGS. 2 and 3 will be described in detail in the second embodiment.

According to the first embodiment, when a host (communication device) 206 shown in FIG. 2 communicates with a host (communication partner) 209, the host 206 shares secret data with the host 209 and calculates a hash value on the basis of the secret data. The host 206 sends the hash value to a default gateway (router) 202 or host 204 serving as a digital signature issuance apparatus. The host 206 receives a digital signature generated for the hash value and the address of the host 206 from the default gateway 202 or host 204 (digital signature issuance apparatus) and sends the digital signature to the host 209.

The default gateway (router) 202 or host 204 serving as the digital signature issuance apparatus receives data from the host (second apparatus) 206 which performs cryptographic communication with the host (first apparatus) 209. The default gateway (router) 202 or host 204 generates, using a private key, a digital signature for the received data and the address currently used by the host 206. The default gateway (router) 202 or host 204 sends a certificate of a public key corresponding to the private key and the generated digital signature to the host 206.

The default gateway (router) 202 or host 204 serving as the digital signature issuance apparatus performs server-aided computation to share the secret data used for encryption in accordance with a request from the host 206.

The host 206 has an arrangement as shown in FIG. 3. The host 206 comprises a CPU (generation means) 303 which generates data and a network interface (communication means) 301 which sends the generated data to a digital signature issuance apparatus. The network interface 301 receives a digital signature issued by the digital signature issuance apparatus (default gateway 202 or host 204) for the generated data and the address currently used by the host 206 and sends the issued digital signature to the host (communication partner) 209.

The default gateway 202 or host 204 serving as a digital signature issuance apparatus which issues a digital signature to the host (second apparatus) 206 which performs cryptographic communication with the host (first apparatus) 209 has an arrangement as in FIG. 3. The default gateway 202 has a network interface (communication means) 302 which communicates with the host 206 while the host 204 has the network interface (communication means) 301 which communicates with the host 206. Each of the default gateway 202 and host 204 comprises the CPU (generation means) 303 which generates, using a private key, a digital signature for data received from the host 206 and the address currently used by the host 206. Each unit sends a certificate of a public key corresponding to the private key and the generated digital signature to the host 206.

The second embodiment will be described next.

This embodiment will describe a case wherein a host connects to the Internet via an Ethernet (registered trademark) LAN. The present circumstances will first be described, and then this embodiment will be described. The following explanation will describe the case of IPv6. This embodiment, however, can be applied to IPv4. An additional explanation will be given only for a difference between IPv4 and IPv6, and the case of IPv6 will be described as for points common to IPv4 and IPv6.

Chapter 1.1 describes the environment; 1.2, Internet Key Exchange and a Diffie-Hellman public-key distribution scheme; 1.3, server-aided computation; 1.4, a public-key certificate, the validity of an IP address, and trust in an IKE proxy server; and 1.5, a protocol of this embodiment.

1.1 Environment

FIG. 2 schematically shows a connection environment (environment in which a host connects to the Internet via an Ethernet (registered trademark) LAN) in this embodiment.

FIG. 2 shows an environment in which hosts 204, 205, and 206 connected to a LAN access the Internet 201 via a default gateway 202. In this embodiment, each host connects by a link 207, more specifically, the Ethernet (registered trademark). A link is a facility or medium which allows a connected apparatus to communicate via it, and is in contact with the lower side of an IP layer. Links other than the Ethernet (registered trademark) are a PPP link, X. 25, a frame relay, and an ATM network.

An IPv6 apparatus (the default gateway 202, a DHCP server 203, or each of hosts 203, 204, 205, 206, and 209) connected to a link is called a node. FIG. 3 shows a typical example of the internal arrangement of the node (the default gateway 202, DHCP server 203, or each of the hosts 203, 204, 205, 206, and 209).

The node is either a router or a host. A router transfers packets not addressed to it, but a host does not. As shown in FIG. 3, the node is a computer having, e.g., network interfaces 301 and 302, CPU 303, ROM 304, RAM 305, HD (hard disk) 306, power supply unit 307, keyboard/pointing device interface 308, monitor interface 309, and bus 310.

While a router has multiple network interfaces 301 and 302, a host has one network interface 301 in many cases. By the network interface 301, the hosts 204, 205, and 206 communicate with, through the link 207, another node connected to the link 207 or with, further through the default gateway 202, a node on the Internet 201. The default gateway 202 performs communication by the network interface 301 through the Internet 201 or by the network interface 302 through the link 207. Some nodes have no HD.

The following process contents (procedures) are implemented as a program or module, and a node having the ROM 304 or HD 306 in which the program is stored executes the procedures or a node having this module executes the procedures. For example, when the procedures are implemented as a program, the CPU 303 serving as a computer loads the program, and assigns the network interface 301 an address through the bus 310, while using the RAM 305 as a computation space as needed. In the case of a module, an entity which performs the same operation as the above-mentioned operation performed by a program in cooperation with a CPU, RAM, and the like is implemented as, e.g., an LSI and is incorporated in a node. An instruction is issued from the CPU of the node to the module (LSI). Upon reception of the instruction, the module operates to perform processing.

Hereafter, the essence of the procedure will be described like "a node 300 assigns an address to an interface."

When the node 300 connected to the link 207 in FIG. 2 is powered on or rebooted, Stateless Address Autoconfiguration defines an interface ID unique in the link (generated in an Modified EUI-64 format from a MAC address). If the subnet prefix for an (aggregatable) global address assigned to the link is obtained from Router Advertisement (RA), the (aggregatable) global address made up of the subnet prefix and interface ID is automatically set so as to be used as the address of the node 300. The address of the default gateway 202 (generally referred to as a router) is also automatically set. In many cases, the default gateway 202 sends out RA to the link. A detailed description is given in RFC2462 "IPv6 Stateless Address Autoconfiguration".

If a random value unique in the link is used as the interface ID upon execution of Stateless Address Autoconfiguration, a temporary address from which the third party on the Internet cannot grasp the correspondence with a node can be used. A detailed description is given in RFC3041 "Privacy Extensions for Stateless Address Autoconfiguration in IPv6".

In the case of IPv4, the IPv4 address used by the node 300 and the address of the default gateway 202 (router) are manually set by the user or are automatically set by the DHCP server 203. If the IPv4 address is manually set, it is kept fixed unless changed. On the other hand, if the IPv4 address is automatically set by the DHCP server 203, it is not always fixed. IPv4 addresses include two types of addresses, i.e., a private address and global address. These addresses are selectively used in accordance with the network operation policy. Even when a node uses a private address, the node can communicate with another apparatus connected to the Internet if the gateway performs Network Address Translation (generally called NAT) and translates the private address into a global address.

When the (global) address used by the node 300 and the address of the default gateway 202 (router) are set, the node 300 can communicate with a node on another link connected to the Internet 201 (e.g., the host 209).

1.2 Internet Key Exchange (IKE) and Diffie-Hellman Public-Key Distribution Scheme (DH)

The outline of IKE and DH will be described.

Figure 7:
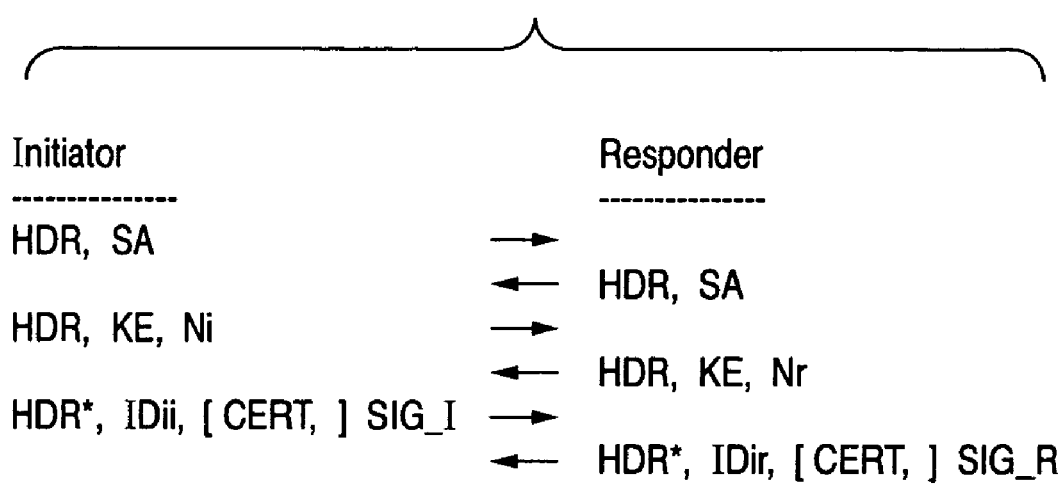
FIG. 7 is a view of phase 1 of IKE in confirming a partner using a digital signature.

IKE has phase 1 and phase 2. FIG. 7 shows phase 1 in which a digital signature is used to authenticate a communication partner. A subscript i or I indicates information to be sent by an initiator. A subscript r or R indicates information to be sent by a responder. HDR indicates an ISAKMP header, and data described to the right of this header represents a payload. For example, "HDR, SA" indicates that the payload of an ISAKMP packet is SA. HDR* indicates that the payload of the packet is encrypted.

SA in FIG. 7 indicates an SA negotiation payload which stores Security Association candidates, and KE includes pieces y_i and y_r (FIG. 4) of information (to be described later) exchanged by Diffie-Hellman. Ni and Nr are Nonce, and IDii and IDir are the identification payloads of an ISAKMP initiator and ISAKMP responder. CERT is a public-key certificate of the initiator or responder. When a symbol is enclosed in brackets, it can be omitted. SIG_I is a digital signature generated by the initiator for HASH_I. SIG_R is a digital signature generated by the responder for HASH_R.

HASH_I and HASH_R are hash values generated from data exchanged to that point in the following manner:

HASH_I=prf(SKEYID, g^xi|g^xr|CKY-I|CKY-R|SAi^b|IDii_b)
HASH_R=prf(SKEYID, g^xr|g^xi|CKY-R|CKY-I|SAi_b|IDir_b)

where prf(key,msg) is a keyed pseudo-random function. Upon reception of arguments key and msg, the function outputs a pseudo-random number. SKEYID is a value calculated by inputting data shared by Ni, Nr, and DH to the function prf, xi and xr are secrets, respectively, generated by the initiator and responder, and g is a generator in DH. CKY-I and CKY-R are cookies, respectively, of the initiator and responder (contained in the ISAKMP header). SAi_b is the entire body of the SA payload (minus the ISAKMP generic header). IDii_b and IDir_b are an IDii payload body and IDir payload body, respectively.

Figure 4:
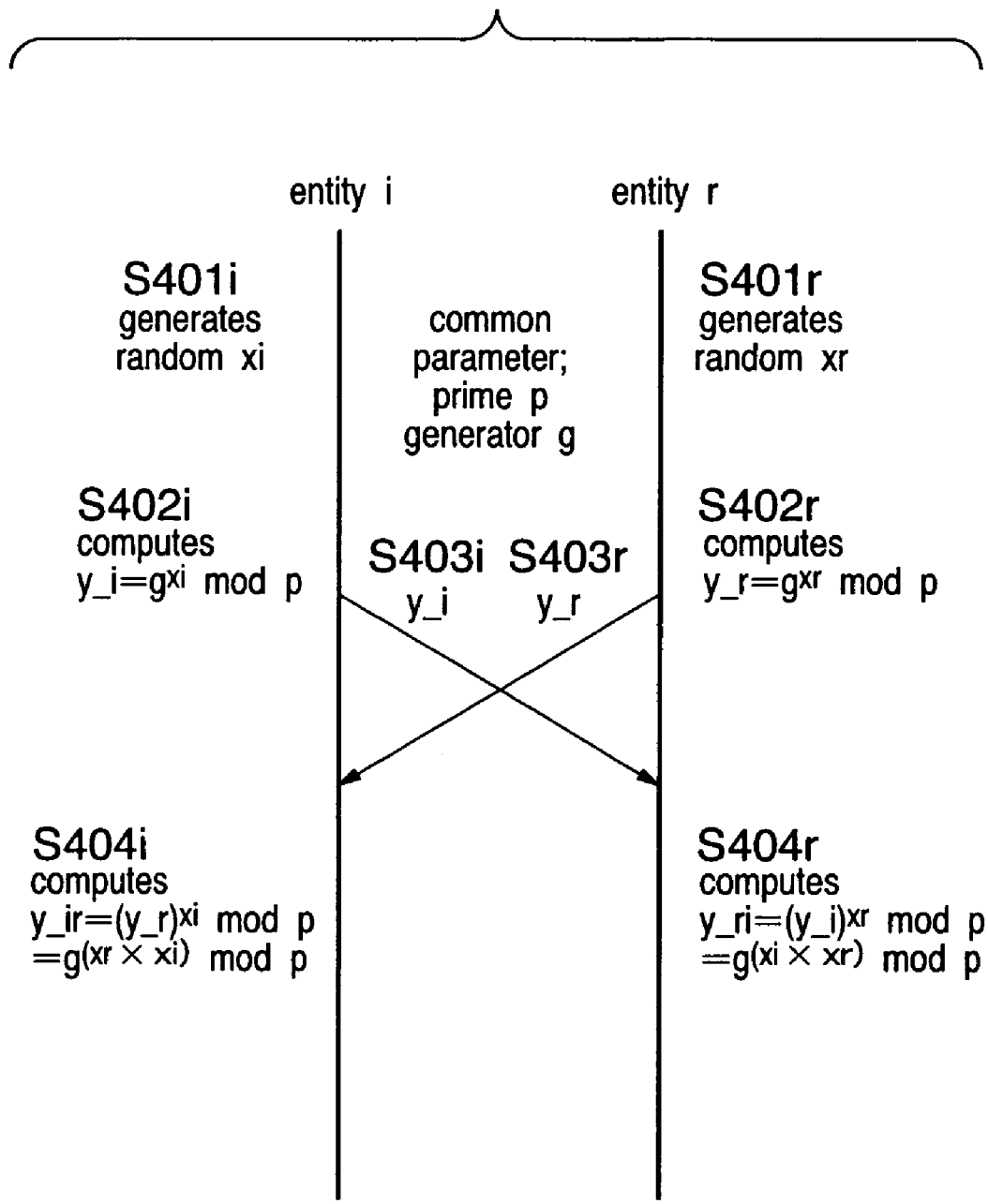
FIG. 4 is a chart of a Diffie-Hellman public-key distribution scheme.

FIG. 4 shows DH. Assume that an entity i in FIG. 4 is made to correspond to the initiator in FIG. 7, and an entity r in FIG. 4 is made to correspond to the responder in FIG. 7. In this case, KE sent from the initiator to the responder in the third step in FIG. 7 corresponds to y_i in step S403i of FIG. 4, and KE sent from the responder to the initiator in the fourth step in FIG. 7 corresponds to y_r in step S403r of FIG. 4.

As a result of performing DH, y_ir=y_ri=g^(xi*xr) mod p is shared between the entity i and entity r. The third party which observes parameters p and g and the data y_i and y_r to be exchanged cannot know the shared data y_ir=y_ri=g^(xi*xr) mod p.

Accordingly, each of the initiator and responder having performed DH by the data exchanges in the third and fourth steps in FIG. 7 can generate an encryption key at this time. Two data to be encrypted exchanged in the fifth and sixth steps in FIG. 7 are encrypted using the encryption key. A detailed encryption key generation method is described in RFC2409 "The Internet Key Exchange (IKE)".

At the end of phase 1, an exchange between the initiator and the responder is protected by encryption (ISAKMP SA is established), and other apparatuses cannot decrypt encrypted communication.

Figure 8:
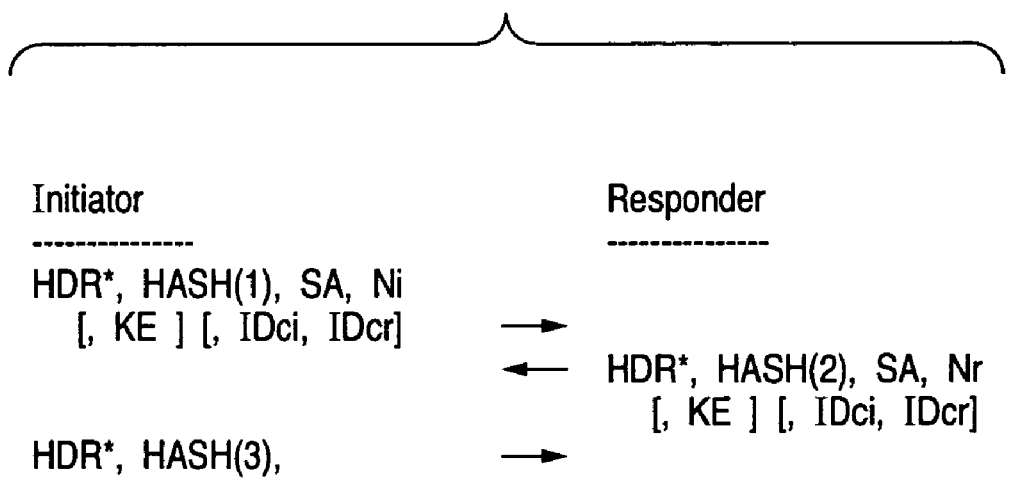
FIG. 8 is a view of phase 2 (quick mode) of IKE.

Using the cryptographic communication, phase 2 (quick mode) shown in FIG. 8 is performed to share IPsec SA for communication from the initiator to the responder and IPsec SA for communication from the responder to the initiator. The same reference symbols in FIG. 8 have the same meanings as those in FIG. 7. In phase 2, DH may or may not be performed.

Figure 9:
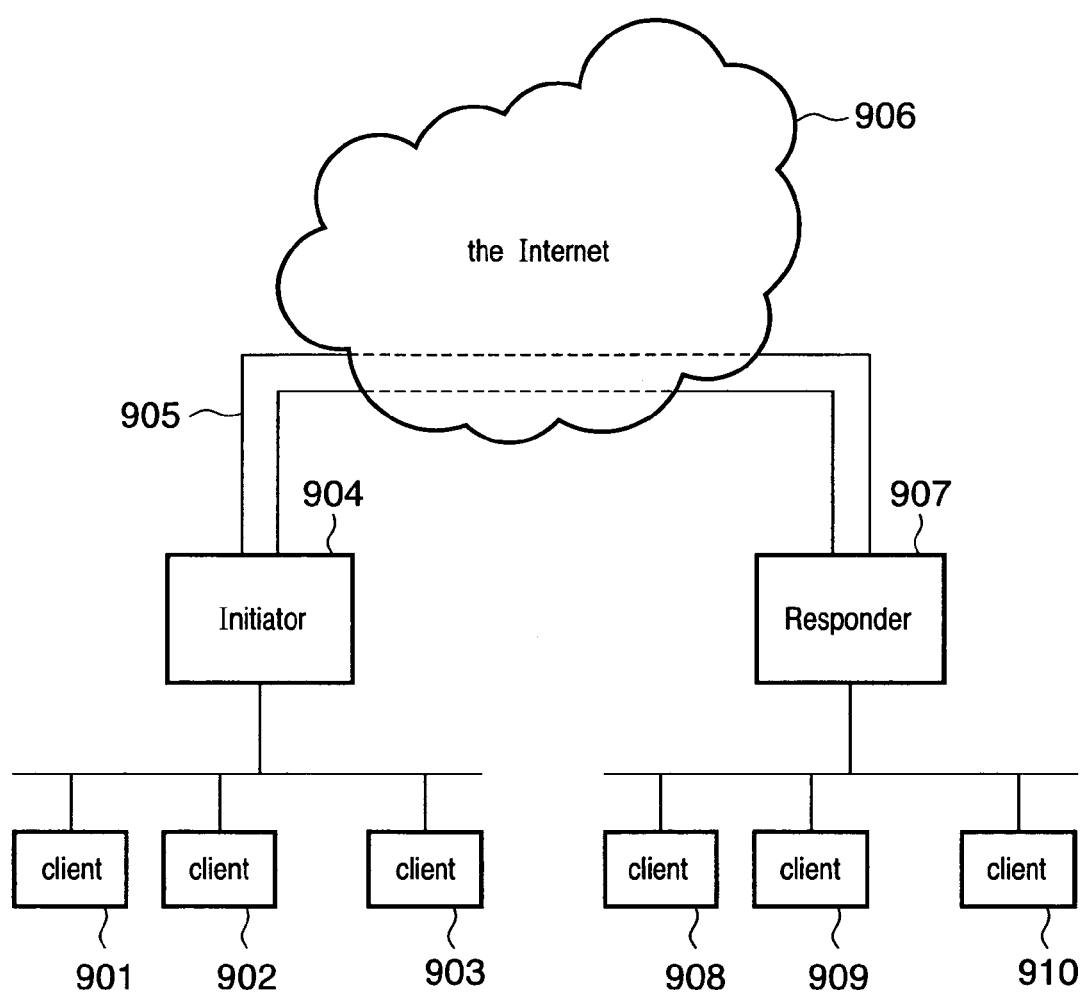
FIG. 9 is a schematic view of a tunnel mode of IPsec.

When IPsec is performed in a tunnel mode, two nodes (e.g., 901 and 908) different from an initiator 904 and responder 907 which perform ISAKMP (serving as the two ends of a tunnel) can serve as the two ends of IPsec, as shown in FIG. 9. Nodes (901, 902, 903, 908, 909, and 910) at the two ends which communicate with each other using a tunnel 905 are called clients. IDci and IDcr represent the ID payloads of the clients (clients on the initiator and responder sides). See RFC 2409 as for other details.

When phase 2 ends, IPsec SA is determined for each of the channels in the two directions between the initiator and the responder. IPsec communication can be performed using the SAs in subsequent processing.

1.3 Server-Aided Computation

In this embodiment, a case will be described wherein the host 206 connected to the link 207 uses IKE to perform IPsec communication with the host 209 on another link connected to the Internet 201. In this case, the host 206 does not perform all of the processes of IKE alone and does not use its certificate. Another apparatus connected to the link 207 of the host 206 (e.g., the default gateway 202 or host 204) performs DH computation in IKE in cooperation with the host 206. As the cooperative computation, a method called server-aided computation can be used. In server-aided computation, an apparatus (client) with low computing performance requests computation from an apparatus (server) with high computing performance while concealing secret information necessary for the computation.

Figure 5:
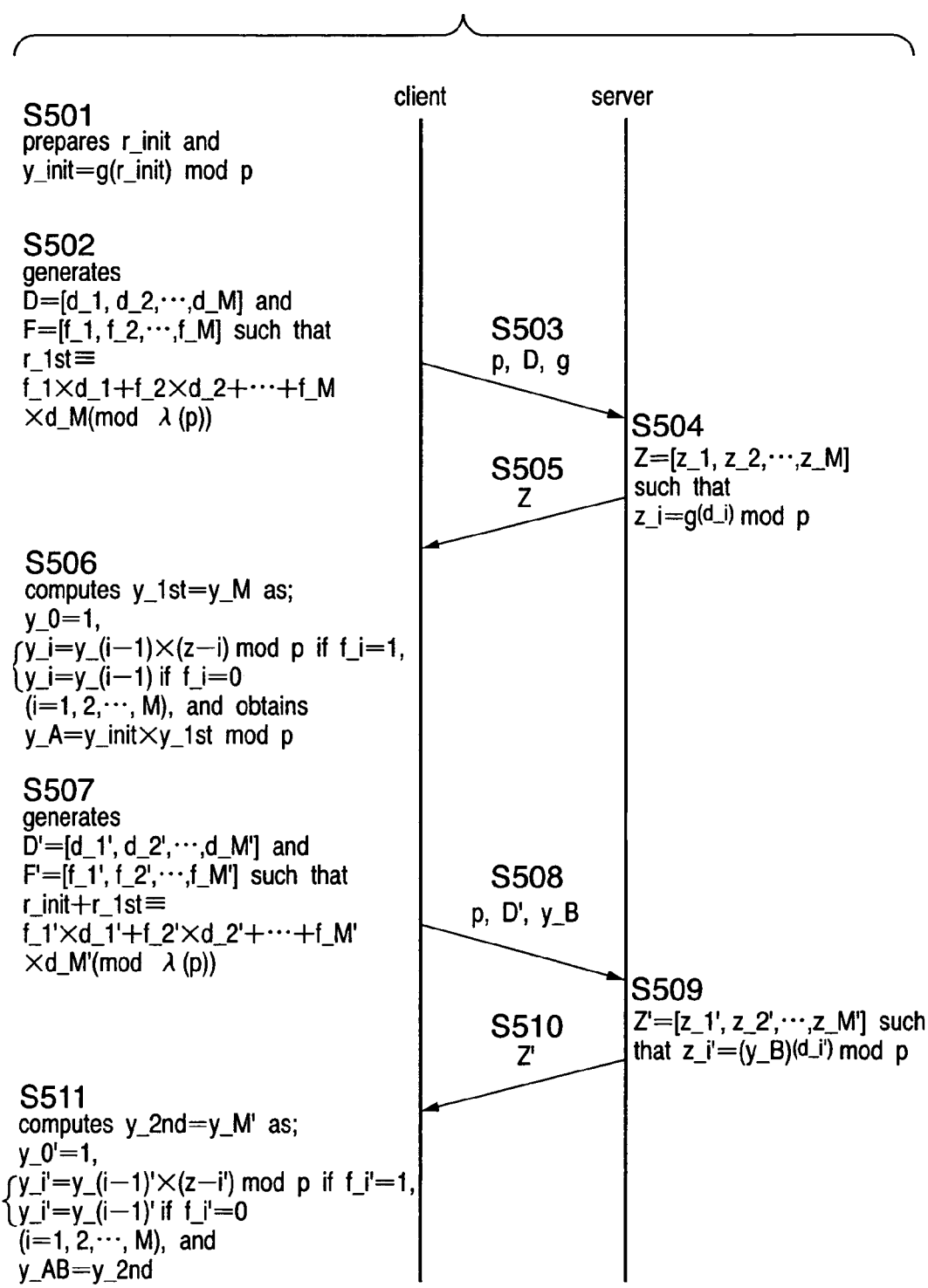
FIG. 5 is a chart of a protocol for DH server-aided computation.

Server-aided computation will be described with reference to FIG. 5. FIG. 5 shows a protocol performed when a client and server perform DH server-aided computation. This method is proposed in Japanese Patent Application No. 2003-314000 (U.S. patent application Ser. No. 10/930,958, EP Patent Application No. 04255378.4, and Chinese Patent Application No. 200410068630.9). This embodiment will describe its outline.

The client (node A) 206 has secret information x_A, and intends to obtain y_AB=(y_B)^(x_A) mod p to be finally shared with the communication partner (node B, e.g., the host 209 not shown in FIG. 5 but shown in FIG. 2) which performs IPsec communication, and y_A=g^(x_A) mod p which is necessary during the course of the processing in order to obtain y_AB, by using the server-aided computation protocol. The x_A is a secret of the client 206, and g and p are open to the public. The Carmichael function of p is λ(p). The client knows the IP address of the server (202 or 204).

In step S501, the client 206 prepares random numbers $r\_init$ and $y\_init = g^{(r\_init)} \bmod p$. The $r\_init$ is an integer of 1 (inclusive) to p (exclusive). If the protocol shown in FIG. 5 was executed in the past, r and $g^r \bmod p$ calculated last are used as $r\_init$ and $y\_init = g^{(r\_init)} \bmod p$, respectively. Also, if this protocol is to be executed for the first time, the client 206 which is an IPv6 apparatus is shipped such that $y\_init = g^{(r\_init)} \bmod p$ already calculated by generating the random number $r\_init$ during the manufacture is recorded. Alternatively, the random number $r\_init$ is generated to calculate $y\_init = g^{(r\_init)} \bmod p$ in a standby state (in which the server-aided computation protocol is not executed), and the result of the calculation is recorded.

In step S502, the client 206 randomly generates integer vector $D = [d\_1, d\_2, \ldots, d\_M]$ and binary vector $F = [f\_1, f\_2, \ldots, f\_M]$ by which $r\_1st = f\_1 * d\_1 + f\_2 * d\_2 + \ldots + f\_M * d\_M \pmod{\lambda(p)}$. Note that M and L are some integers, $d\_i$ is 1 (inclusive) to p (exclusive), and the weight of F (the number of elements having a value of 1, of the elements $f\_1, f\_2, \ldots, f\_M$ of F) is L or less. In step S503, the client 206 sends p, D, and g to the server (202 or 204).

In step S504, the server (202 or 204) computes $Z = [z\_1, z\_2, \ldots, z\_M]$ by which $z\_i = g^{(d\_i)} \bmod p$. In step S505, the server sends Z to the client.

In step S506, the client 206 computes $y\_1st = y\_M$ on the basis of F generated in step S502 and Z received in step S505 as follows. That is, assuming that $y\_0 = 1$, the client 206 computes $y\_i = y\_(i-1) * (z\_i) \bmod p$ if $f\_i = 1$, and computes $y\_i = y\_(i-1)$ if $f\_i = 0$, for $i = 1, 2, \ldots, M$. The client then records $r\_1st$ and $y\_1st$ ($= g^{(r\_1st)} \bmod p$), and obtains $y\_A$ by $y\_A = y\_init * y\_1st \bmod p$. Since the client (node A) 206 has executed IKE together with the node B (209), it sends $y\_A$ to the node B and receives $y\_B$ from the node B (not shown).

In step S507, the client 206 randomly generates integer vector $D' = [d\_1', d\_2', \ldots, d\_M']$ and binary vector $F' = [f\_1', f\_2', \ldots, f\_M']$ by which $r\_init + r\_1st = f\_1' * d\_1' + f\_2' * d\_2' + \ldots + f\_M' * d\_M' \pmod{\lambda(p)}$. Note that M' and L are certain integers, $d\_i'$ is 1 (inclusive) to p (exclusive), and the weight of F' (the number of elements having a value of 1, of the elements $f\_1', f\_2', \ldots, f\_M'$ of F') is L or less. In step S508, the client 206 sends p, D', and $y\_B$ to the server (202 or 204).

In step S509, the server (202 or 204) computes $Z' = [z\_1', z\_2', \ldots, z\_M']$ by which $z\_i' = (y\_B)^{(d\_i')} \bmod p$. In step S510, the server sends Z' to the client.

In step S511, the client 206 computes $y\_2nd = y\_M'$ as follows. That is, assuming that $y\_0' = 1$, the client computes $y\_i' = y\_(i-1)' * (z\_i') \bmod p$ if $f\_i' = 1$, and computes $y\_i' = y\_(i-1)'$ if $f\_i' = 0$, for $i = 1, 2, \ldots, M$. The obtained $y\_2nd$ is used as $y\_AB$ ($y\_AB := y\_2nd$).

DH is executed once by executing the above server-aided computation protocol twice. To execute DH next, $r\_1st$ and $y\_1st = g^{(r\_1st)} \bmod p$ are used as $r\_init$ and $y\_init = g^{(r\_init)} \bmod p$.

1.4 Pulic-Key Certificate, Validity of IP Address, and Trust in IKE Proxy Server In this embodiment, IKE is performed while another node (to be referred to as an IKE proxy server) connected to the same link 207 as the host 206 monitors the IP address used by the host 206. The monitoring makes it possible to reliably prevent impersonation which means that a node other than the host 206 and IKE proxy server uses the IP address used by the host 206. More specifically, since the IKE proxy server is connected to the same link 207 as the host 206, prevention of impersonation can be implemented by using information on the link layer (e.g., an MAC address). There can be considered a plurality of monitoring methods. For example, recording and monitoring the correspondence between the MAC address and the IP address makes it possible to detect an attempt of another node (with another MAC address) to use the IP address. In this embodiment, the apparatus 202 connected to the same link as the apparatus 206 which performs IPsec communication and is different from the apparatus 206 monitors the IP address of the apparatus 206. This makes it possible to detect any man-in-the-middle-attack. The behavior of another apparatus impersonating as the apparatus 206 using the IP address used by the apparatus 206 can be detected using data on the link layer.

In this embodiment, the IKE proxy server generates, using its public-key certificate, a digital signature for the IP address used by the node 206 and data used to authenticate a communication partner in IKE (HASH_I or HASH_R) and sends it to the host 209 serving as the communication partner for authentication. The host 209 confirms the contents of the received certificate, specifies the link 207, and confirms the validity of the received digital signature. With this operation, the host 209 can confirm that data originates from a partner having performed DH and the validity of the IP address of the partner on the link 207.

The IKE proxy server performs monitoring and certifies the validity of an IP address using a certificate. For this reason, assume that the IKE proxy server is trustworthy (does not tell a lie). It is preferable, however, to estimate damage to be suffered by the node 206 when the IKE proxy server becomes untrustworthy for some reasons.

The IKE proxy server can make a man-in-the-middle-attack in IKE. Assume that the node A and node B perform DH. In this attack, a node C serving as an attacker substitutes other contents for communication contents between the node A and the node B, impersonates as the node B with respect to the node A, and impersonates as the node A with respect to the node B. As a result, secret data which the node A believes to be shared with the node B is actually shared between the node A and the node C. Similarly, secret data which the node B believes to be shared with the node A is actually shared between the node B and the node C.

Encryption keys (=decryption keys) generated from secret data shared between nodes are assumed to be K_AB (a key between the node A and the node B), K_AC (a key between the node A and the node C), and K_BC (a key between the node B and the node C), respectively. In this case, a key which the node A believes to be shared with the node B is actually K_AC while a key which the node B believes to be shared with the node A is actually K_BC. Accordingly, when the node A encrypts data and sends it toward the node B, the node C intercepts the encrypted data and decrypts it using K_AC. The node C encrypts the decrypted data using K_BC and sends it to the node B. The node B decrypts the received encrypted data using K_BC. Encrypted data to be sent from the node B to the node A is processed in the same manner. Although the node B receives data encrypted and sent by the node A in an encrypted state, cryptographic communication between the node A and the node B is actually intercepted by the node C.

IKE authenticates a communication partner to detect any man-in-the-middle-attack and prevent cryptanalysis. Communication partner authentication methods are classified into two methods, ones using a pre-shared key and ones using a public key. To perform IPsec on the Internet with many unspecified communication partners, a pre-shared key cannot be used. In the case of a public key, a node (the correspondence between its ID and the public key) is confirmed using a public-key certificate. In this embodiment, since the host 206 does not have a certificate, the communication partner of the host 206 cannot confirm the host 206.

If the present invention is applied to an initiator (when the host 206 on the same link as the IKE proxy server is the initiator), the initiator (host 206) can detect any man-in-the-middle-attack as far as a responder (host 209) has its public-key certificate. In IKE which authenticates a communication partner using a digital signature, the responder generates partner confirmation data (digital signature) using a private key corresponding to its public-key certificate. Since an attacker which makes a man-in-the-middle-attack does not have the private key corresponding to the public-key certificate of the responder, the attacker cannot generate the partner confirmation data (digital signature); hence, impersonation is prevented.

In a case where the present invention is applied to the initiator, and at least the responder has its public-key certificate, the initiator can detect any man-in-the-middle-attack. In other cases (e.g., both the initiator and responder use the present invention), the IKE proxy server may cryptanalyze IPsec communication. It is preferable to define whether to allow the cryptanalysis in the security policy and cope with the cryptanalysis.

In the latter case, a node (e.g., the node 205) other than the node 206 on the link 207 and the IKE proxy server (default gateway 202) cannot make a man-in-the-middle-attack, i.e., cannot perform cryptanalysis. When a tunnel mode of IPsec is used, data on a link outside the tunnel is a plaintext, so that another node on the link can intercept (and know) the data. This embodiment is characterized in that other nodes on the same link cannot perform interception (i.e., cannot know the data).

FIG. 9 is a schematic view of a case using the tunnel mode of IPsec. The initiator 904 and responder 907 perform IKE and form the tunnel 905 of IPsec on the Internet 906. Communication protected by the IPsec tunnel 905 can be performed between nodes (the client 901, client 902, . . . , and client 903) using the initiator 904 as a gateway and nodes (the client 908, client 909, . . . , and client 910) using the responder 907 as a gateway. For example, if the client 901 communicates with the client 908, the client 902 on the same link as the node group 901 can intercept communication between the client 901 and the client 908. However, in this embodiment, communication between the node 206 and the node 209 is encrypted end to end. A node on the link 207 which is not the IKE proxy server (e.g., the node 205) cannot intercept the communication. Accordingly, this embodiment is safer than a case using the tunnel mode of IPsec.

1.5 Protocols for this Embodiment

Figure 1:
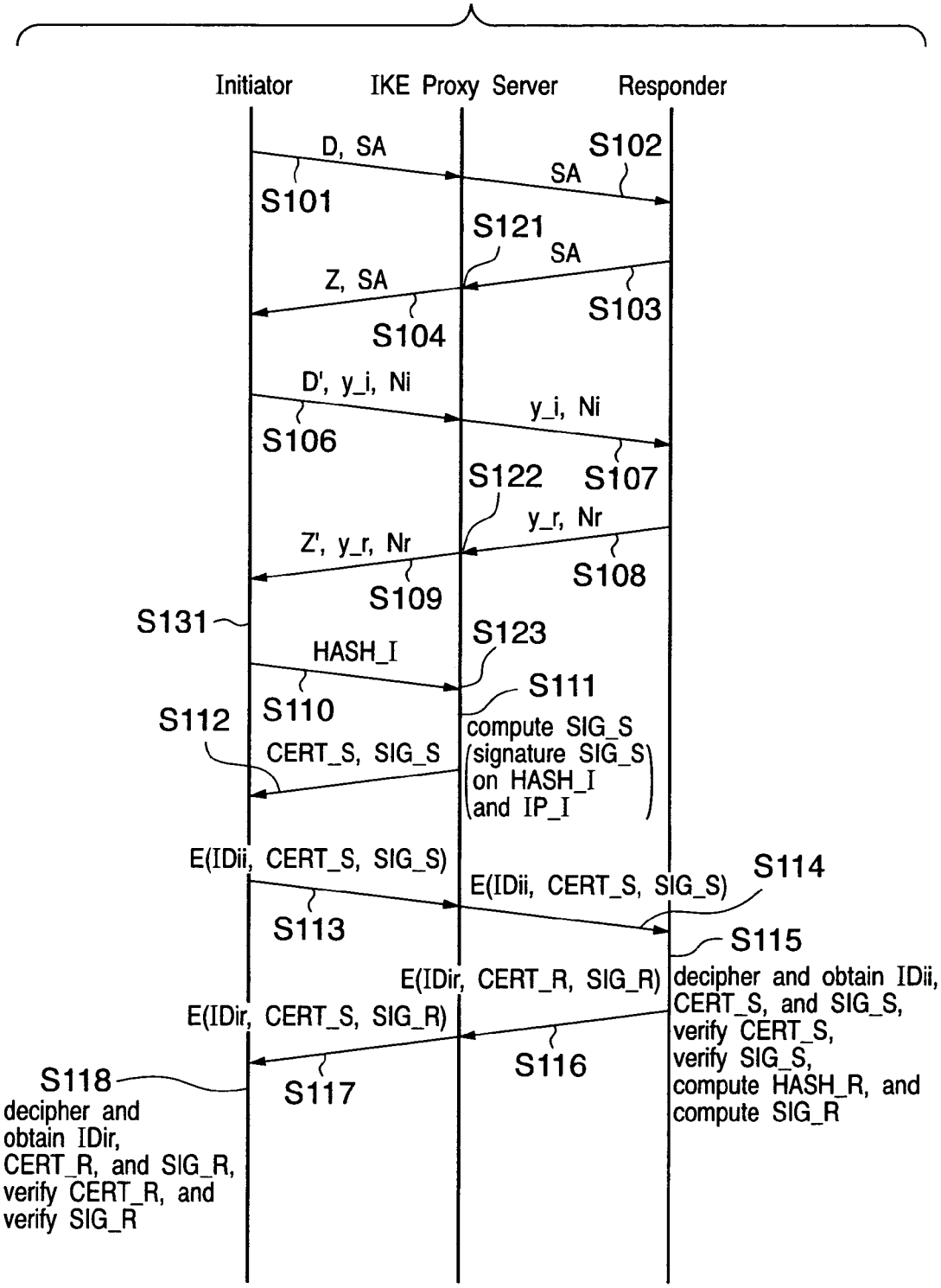
FIG. 1 is a chart of a protocol used when a default gateway performs IKE by proxy in the first embodiment.
Figure 6:
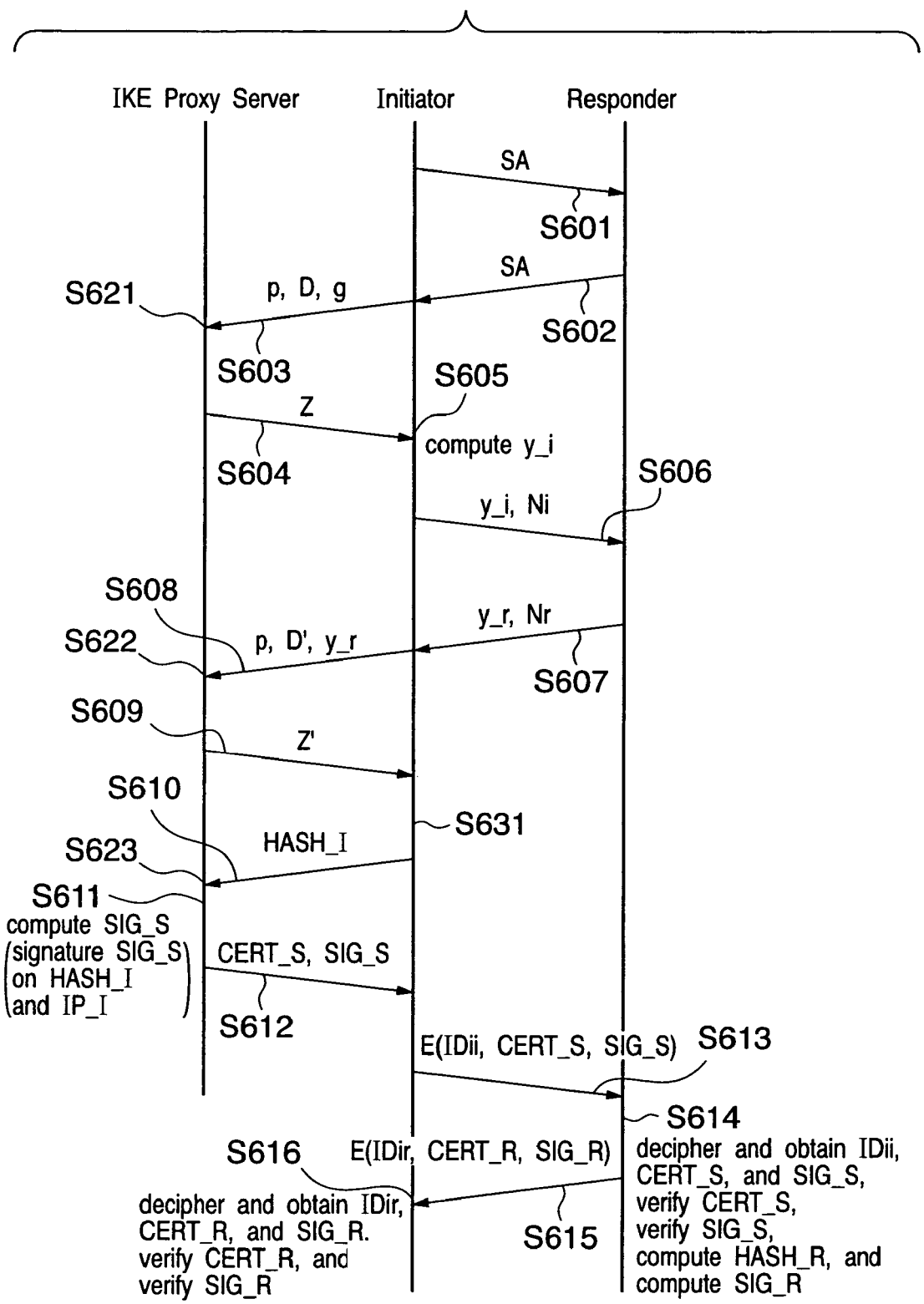
FIG. 6 is a chart of a protocol used when an apparatus other than a default gateway performs IKE by proxy in the second embodiment.

Protocols for this embodiment will be described next. The protocols are classified into two cases, a case wherein the default router 202 is used as the IKE proxy server and a case wherein a node on the link 207 (e.g., the host 204) other than the default router 202 is used as the IKE proxy server. FIG. 1 shows the former protocol, and FIG. 6 shows the latter protocol. In FIGS. 1 and 6, "Initiator" indicates the host 206 while "Responder" indicates the host 209. The host 204 (also 205 and 206) communicates with the default gateway 202 by the network interface 301 through the link 207. The host 209 communicates with the default gateway 202 by the network interface 301 through the Internet 201. The default gateway 202 communicates with the host 209 by the network interface 301 through the Internet 201 and communicates with the hosts 204, 205, and 206 by the network interface 302 through the link 207. In FIG. 1, the IKE proxy server is located in the path from the initiator to the responder. The number of times the initiator performs transmission/reception is smaller and is more efficient than the case of FIG. 6.

The premise of this embodiment will be described. The IKE proxy server has its public key and private key (both of which are stored in the HD 306), and the private key is securely managed such that only the IKE proxy server can access it. A public-key certificate CERT_S for the IKE proxy server is issued from a CA (certification authority). The public-key certificate CERT_S for the IKE proxy server is stored in (the HD 306 of) the IKE proxy server. The public-key certificate CERT_S for the IKE proxy server contains the IPv6 global address of the IKE proxy server and a description indicating that the apparatus in question is the IKE proxy server. For example, if X.509v3 is used as the format of the public-key certificate, a method of defining and describing the information indicating that the apparatus is the IKE proxy server in subjectAltName can be considered. Any other definition/description method may be adopted as far as an apparatus on the other end which performs IKE (in this embodiment, the responder) agrees to the definition/description method.

The responder holds a public-key certificate CERT_R (in the HD 306) issued from the CA to the responder. For example, if the responder is a Web site, its FQDN (Fully Qualified Domain Name) is described in the public-key certificate for the responder. On the other hand, if the responder is a node which uses a fixed IPv6 address, the fixed IPv6 address is described in the public-key certificate for the responder. Both the initiator and responder hold a public-key certificate of the CA (containing the public key of the CA) (in the HD 306).

The initiator knows the IP address of the IKE proxy server (stores in the HD 306). The responder and initiator know the public key of the CA (store it in the HD 306).

The flow of the protocol and the operation of this embodiment will be described in detail with reference to FIG. 1.

Assume that the initiator 206 learns the IPv6 address of the responder by DNS using the FQDN of the responder 209 or by another means. The operation will be described from a state wherein the initiator is ready to perform communication in an IPsec transport mode with the responder.

In step S101, the initiator 206 sends a parameter necessary for server-aided computation of $y\_i = g^{x_i} \mod p$ to the IKE proxy server 202 and sends a plurality of SA proposals to the responder 209. Since the parameter necessary for server-aided computation of $y\_i = g^{x_i} \mod p$ is D in FIG. 5, the parameter is indicated by D in FIG. 1. In FIG. 1, the transfer in step S101 is indicated by one arrow. Actually, the data is transferred in different packets. The initiator 206 prepares random numbers r_init and y_init, similarly to step S501 in FIG. 5.

Since the IKE proxy server 202 is a default gateway, it transfers each SA proposal addressed to the responder 209 to the responder and receives a parameter addressed to the IKE proxy server. The IKE proxy server 202 starts monitoring an IPv6 address IP_I used by the initiator 206 (obtained from a packet addressed to the IKE proxy server) and monitoring the contents of communication between the initiator 206 and the responder 209 in order to prevent other nodes from impersonating as the initiator. More specifically, while monitoring the IP address used by an apparatus (initiator 206) performing IKE (Internet Key Exchange), the IKE proxy server 202 performs server-aided computation (FIG. 5) of a Diffie-Hellman public-key distribution scheme, in accordance with a request from the apparatus (initiator).

In step S102, the responder 209 receives a plurality of SA proposals and selects one to be used from the plurality of SA proposals. In step S103, the responder sends the selected SA to the initiator 206.

Upon reception of the SA addressed to the initiator 206, the IKE proxy server 202 extracts DH parameters g and p from the contents and performs server-aided computation of y_i=g^xi mod p using the parameter D received in step S101 and the parameters g and p (step S121). The server-aided computation is the computation in step S504 of FIG. 5. In step S104, the IKE proxy server sends the SA and the server-aided computation result to the initiator 206. Since the server-aided computation result corresponds to Z in FIG. 5, it is indicated by Z in FIG. 1. The IKE proxy server 202 performs server-aided computation in accordance with a request from the initiator 206 in this manner.

In step S105, the initiator 206 calculates (y_1st and further) y_i on the basis of the server-aided computation result Z. The calculation corresponds to the calculation to obtain y_A in step S506 of FIG. 5. First, y_1st is calculated, and y_i is calculated from y_1st and y_init.

In step S106, the parameter necessary for server-aided computation of y_r^xi mod p is sent to the IKE proxy server 202, and y_i and N_i are sent to the responder 209. The parameter necessary for server-aided computation of y_r^xi mod p corresponds to D' in FIG. 5 and is indicated by D' in FIG. 1. y_i is used by the responder 209 to calculate y_ri. In FIG. 1, the transfer in step S106 is indicated by one arrow. Actually, the data is transferred in different packets.

The IKE proxy server 202 receives a parameter addressed to the IKE proxy server and transfers y_i and N_i addressed to the responder to the responder 209 in step S107. In step S108, the responder 209 sends y_r (=g^x_r mod p) and Nr to the initiator 206. In this case, y_r and Nr correspond to KE and Nr to be sent from the responder to the initiator at the four step in FIG. 7. The responder 209 calculates y_ri (=y_ir) on the basis of y_i and x_r.

Upon reception of y_r and Nr addressed to the initiator 206, the IKE proxy server 202 performs server-aided computation of y_r^xi mod p (step S122). The server-aided computation corresponds to the computation in step S509 of FIG. 5. In step S109, the IKE proxy server 202 sends the server-aided computation result and y_r and Nr to the initiator. The server-aided computation result corresponds to Z' in FIG. 5 and is indicated by Z' in FIG. 1. The IKE proxy server 202 performs server-aided computation in accordance with a request from the initiator 206 in this manner.

The initiator 206 receives the server-aided computation result Z' and y_r and Nr and obtains the result of performing DH with the responder 209 on the basis of the server-aided computation result Z'. The calculation corresponds to the calculation to obtain y_AB in step S511 of FIG. 5. In the server-aided computation, y_ir is calculated from r_init+r_1st. The initiator 206 sends not r_init+r_1st but the parameter D' to the IKE proxy server 202. The initiator 206 shares the secret data y_ir with the responder (communication partner) 209. That is, the initiator 206 shares the secret data y_ir used for encryption using the result of server-aided computation. On the basis of this, the initiator 206 calculates HASH_I (hash value) (step S131).

In step S110, the initiator 206 sends HASH_I to the IKE proxy server 202 (digital signature issuance apparatus). The initiator (host) 206 comprises a CPU (generation means) which generates HASH_I serving as data and the network interface (communication means) 301 which sends the generated data to the IKE proxy server 202 (digital signature issuance apparatus). The CPU 303 generates a key (encryption key shared with the responder 209) and the data HASH_I, on the basis of data exchanged with the responder (communication partner) 209 for key generation.

More specifically, when the initiator 206 shares y_ir (first data) with the responder (communication partner) 209, y_1st (second data) is calculated from r_1st (third data) using server-aided computation. The initiator 206 generates y_i (fourth data) for the responder (communication partner) 209 to calculate y_ri (=y_ir (first data)) from y_1st (second data) and y_init (fifth data). The initiator 206 calculates y_ir (first data) to be shared with the responder (communication partner) 209 using server-aided computation, from r_init+r_1st (sixth data) generated from r_1st (third data) and r_init (seventh data). Since calculation is performed by proxy in this manner, the IKE proxy server 202 which performs calculation by proxy cannot know the key.

The IKE proxy server 202 receives the data HASH_I from the initiator (second apparatus) 206 which communicates with the responder (first apparatus) 209 (step S123).

In step S111, the IKE proxy server 202 calculates a digital signature SIG_S for HASH_I (hash value) and IP_I (the IPv6 address used by the initiator). As the format of the digital signature, various ones can be adopted. In this embodiment, the digital signature SIG_S for data obtained by concatenating HASH_I and IP_I is generated using the private key of the IKE proxy server 202.

In step S112, the IKE proxy server 202 sends CERT_S and SIG_S to the initiator 206. CERT_S denotes the public-key certificate (of a public key corresponding to the private key used to generate SIG_S) of the IKE proxy server 202 (generated by the CA). The public-key certificate CERT_S contains the IP address used by the apparatus (IKE proxy server 202) which has a public key and private key, the public key of the IKE proxy server 202, and information defining that the IKE proxy server 202 is a signature issuance apparatus. More specifically, the IKE proxy server 202 is a digital signature issuance apparatus which issues a digital signature to the initiator (second apparatus) 206 which performs cryptographic communication with the responder (first apparatus) 209 and comprises the network interface (communication means) 302 which communicates with the initiator 206 and the CPU (generation means) 303 which generates a digital signature for data received from the initiator 206 and the address currently used by the initiator 206 using a private key. The network interface 302 sends a certificate of a public key corresponding to the private key and the generated digital signature to the initiator 206. The initiator 206 receives the digital signature generated for the hash value HASH_I and the address of the initiator (communication device) 206 from the IKE proxy server (digital signature issuance apparatus) 202.

In step S113, the initiator 206 encrypts IDii, CERT_S, and SIG_S using the encryption key shared with the responder 209 and sends these data to the responder 209. As described above, a digital signature generated by the IKE proxy server 202 is sent to the responder (communication partner) 209. In step S114, the IKE proxy server 202 sends the data received from the initiator 206 to the responder 209. In FIG. 7, the initiator generates a digital signature SIG_I and sends the digital signature SIG_I (and a public-key certificate CERT for the initiator) to the responder. On the other hand, in FIG. 1, the IKE proxy server 202 generates the digital signature SIG_S. The initiator 206 receives the digital signature SIG_S and the public-key certificate CERT_S of the IKE proxy server 202 from the IKE proxy server 202, encrypts them, and sends them to the responder 209.

The initiator (host) 206 receives, by the network interface 301, a digital signature issued by the IKE proxy server (digital signature issuance apparatus) 202 for the generated data HASH_I and the address currently used by the initiator (host)

206 and sends the generated digital signature to the responder (communication partner) 209. The CPU 303 encrypts the issued digital signature using a generated key (encryption key shared with the responder 209) and sends the digital signature to the responder (communication partner) 209 by the network interface 301.

In step S115, the responder 209 decrypts the received data using the encryption key shared with the initiator 206. The responder 209 confirms the validity of CERT_S (public-key certificate for the IKE proxy server 202) using the public key of the CA. The responder 209 confirms the validity of the public key of the IKE proxy server 202 contained in CERT_S, the IPv6 global address of the IKE proxy server 202, and that the apparatus in question is the IKE proxy server.

Then, the responder 209 calculates HASH_I. The responder 209 confirms using the public key of the IKE proxy server 202 that the received SIG_S (digital signature generated by the IKE proxy server 202 for data obtained by concatenating HASH_I and IP_I) is a signature of the IKE proxy server 202 for HASH_I and a destination address IP_I' (the destination address of SA in S103 and y_r and Nr in S108) used to communicate with the initiator 206.

The responder 209 also confirms that the subnet prefix (/64) of the IPv6 global address of the IKE proxy server 202 is the same as the subnet prefix (/64) of the IP_I'. By confirming using a certificate of the default gateway 202 used in IKE which is performed by the default gateway 202 by proxy that the IP address of the apparatus 206 which performs IPsec communication is certified by the default gateway 202 which is different from the apparatus 206, the host 209 serving as a communication partner of the apparatus 206 can confirm the validity of the IP address currently used by the apparatus 206. When the confirmation is successfully complete, the responder 209 calculates HASH_R and generates the signature SIG_R corresponding to HASH_R.

In step S116, the responder 209 encrypts IDir, CERT_R, and SIG_R using the encryption key shared with the initiator 206 and sends them to the initiator 206. In step S117, the IKE proxy server 202 sends the data received from the responder 209 to the initiator 206. The initiator 206 receives the data from the responder 209. CERT_R denotes a public-key certificate of the responder.

In step S118, the initiator 206 decrypts the received data using the encryption key shared with the responder 209. The initiator 206 confirms the validity of the CERT_R using the public key of the CA, confirms the validity of the public key of the responder 209 contained in CERT_R, and confirms that the FQDN or IPv6 address contained in CERT_R is equal to that used at the start of step S101. The initiator 206 calculates HASH_R and confirms using the public key of the responder that SIG_R is a signature of the responder 209 for HASH_R.

With the above-mentioned operation, phase 1 of IKE ends, and ISAKMP SA is established/set between the initiator 206 and the responder 209. After that, phase 2 is performed, as described above, IPsec SA is set, and IPsec communication is performed.

When the IKE proxy server 202 detects impersonation of another node as the initiator, it cancels processes after the detection. The processes to be canceled includes transmission of the (SA and) server-aided computation result Z to the initiator 206 (S104), (transfer of y_i and Ni to the initiator 206 (step S107),) transmission of the server-aided computation result Z' (and y_r and Nr) to the initiator (step S109), and transmission of CERT_S and SIG_S to the initiator 206 (step S112). When the default gateway 202 which is different from the apparatus 206 that performs IPsec communication and which is connected to the same link as the apparatus 206 monitors the IP address of the apparatus 206, the behavior of another apparatus impersonating as the apparatus 206 using the IP address used by the apparatus 206 can be detected using data on the link layer.

As described above, in this embodiment, the host 206 is a communication device and comprises the CPU (generation means) 303 which generates data and the network interface (communication means) 301 which sends the generated data to the default gateway (digital signature issuance apparatus) 202. The network interface 301 receives a digital signature issued by the default gateway 202 for the generated data and the address currently used by the host 206 and sends the generated digital signature to the host 209.

More specifically, the IKE proxy server 202 performs server-aided computation of a Diffie-Hellman public-key distribution scheme and monitors the correspondence between the IP address used by the apparatus and the apparatus. The IKE proxy server 202 generates a digital signature for data HASH generated by the apparatus performing IKE (initiator 206) and the IP address currently used by the apparatus 206 and issues the digital signature to the apparatus 206. The validity of the digital signature is confirmed by a public-key certificate in which execution of monitoring is described. While monitoring the IP address used by the apparatus 206 performing IKE, the IKE proxy server 202 performs server-aided computation of a Diffie-Hellman public-key distribution scheme in IKE (Internet Key Exchange) in accordance with a request from the apparatus 206 and generates and issues a digital signature for HASH and the currently used IP address of the apparatus 206. The apparatus 206 performing IKE sends the issued signature to the IKE communication partner (responder 209). The IKE communication partner 209 confirms the validity of the address used by the apparatus 206 using the signature. The apparatus 206 authenticates the IKE communication partner 209 using the signature of the IKE communication partner 209.

The third embodiment of the present invention will be described.

In the second embodiment, the default gateway 202 (router) serves as an IKE proxy server. In this embodiment, the flow of the protocol and the operation of a case will be described in detail wherein a node other than a default gateway 202 (router) on a link 207 (e.g., a host 204) serves as an IKE proxy server.

The premise and basic flow are the same as those of the second embodiment in FIG. 1. The following process contents (procedures) are implemented as a program or module, and a node having a ROM 304 or HD 306 (i.e., a storage medium) in which the program is stored executes the procedures or a node having this module executes the procedures. For example, when the procedures are implemented as a program, a CPU 303 serving as a computer loads the program, and assigns a network interface 301 an address through a bus 310, while using a RAM 305 as a computation space as needed. In the case of a module, an entity which performs the same operation as the above-mentioned operation performed by a program in cooperation with a CPU, RAM, and the like is implemented as, e.g., an LSI and is incorporated in a node. An instruction is issued from the CPU of the node to the module (LSI). Upon reception of the instruction, the module operates to perform processing.

Assume that an initiator 206 learns the IPv6 address of a responder 209 by DNS using the FQDN of the responder 209 or by another means. The operation will be described from a state wherein the initiator 206 is ready to perform IPsec communication with the responder 209. The initiator 206 knows the IP address of an IKE proxy server 204.

In step S601, the initiator 206 sends a plurality of SA proposals to the responder 209. In step S602, the responder 209 receives the plurality of SA proposals, selects one to be used from the plurality of SA proposals, and sends the selected SA to the initiator.

In step S603, the initiator 206 sends parameters necessary for server-aided computation of $y\_i = g\hat{} xi \mod p$ to the IKE proxy server 204. Since the parameters necessary for server-aided computation of $y\_i = g\hat{} xi \mod p$ are p, D, and g in FIG. 5, the parameters are indicated in the same manner in FIG. 6.

The IKE proxy server 204 receives p, D, and g and starts monitoring an IPv6 address IP_I used by the initiator 206 in order to prevent other nodes from impersonating as the initiator. Server-aided computation is performed in accordance with a request from the IKE proxy server 204 (step S621). The IKE proxy server 204 performs server-aided computation of $y\_i = g\hat{} xi \mod p$ using the received p, D, and g. The server-aided computation corresponds to the computation in step S504 of FIG. 5. In step S604, the IKE proxy server 204 sends the SA and the server-aided computation result to the initiator 206. The server-aided computation result corresponds to Z in FIG. 5 and is indicated by Z in FIG. 6. While monitoring the IP address used by the initiator 206 performing IKE (Internet Key Exchange), the IKE proxy server 204 performs server-aided computation of a Diffie-Hellman public-key distribution scheme.

In step S605, the initiator 206 calculates y_i from the server-aided computation result Z. The calculation corresponds to the calculation to obtain y_A in step S506 of FIG. 5. In step S606, the initiator 206 sends y_i and N_i to the responder 209. In step S607, the responder 209 sends y_r and Nr to the initiator 206.

In step S608, the initiator 206 sends parameters necessary for server-aided computation of $y\_r\hat{} xi \mod p$ to the IKE proxy server 204. The parameters necessary for server-aided computation of $y\_r\hat{} xi \mod p$ correspond to p, D', and y_B in FIG. 5 and are indicated by p, D', and y_r, respectively, in FIG. 6. In FIG. 5, y_B corresponds to $g\hat{}(x\_B) \mod p$ calculated by a node B, and y_r in FIG. 6 corresponds to $g\hat{}(x\_r) \mod p$ calculated by the responder 209.

Upon reception of p, D', and y_r, the IKE proxy server 204 performs server-aided computation of $y\_r\hat{} xi \mod p$ (step S622). The server-aided computation is performed in accordance with a request from the IKE proxy server 204. The server-aided computation corresponds to the computation in step S509 of FIG. 5. In step S609, the IKE proxy server 204 sends the server-aided computation result to the initiator 206. The server-aided computation result corresponds to Z' in FIG. 5 and is indicated by Z' in FIG. 6.

The initiator 206 receives the server-aided computation result Z' and obtains the result of performing DH with the responder 209 on the basis of the server-aided computation result Z'. The calculation corresponds to the calculation to obtain y_AB in step S511 of FIG. 5. That is, the initiator (communication device) 206 shares secret data y_ir with the responder (communication partner). On the basis of this, the initiator 206 calculates HASH_I (hash value) (step S631). More specifically, when the initiator 206 shares y_ir (first data) with the responder (communication partner) 209, y_1st (second data) is calculated from r_1st (third data) using server-aided computation. The initiator 206 generates y_i (fourth data) for the responder (communication partner) 209 to calculate y_ri (=y_ir (first data)) from y_1st (second data) and y_init (fifth data). The initiator 206 calculates y_ir (first data) to be shared with the responder (communication partner) 209 using server-aided computation, from r_init+r_1st (sixth data) generated from r_1st (third data) and r_init (seventh data). Since calculation is performed by proxy in this manner, the IKE proxy server 204 which performs calculation by proxy cannot know the key.

In step S610, HASH_I is sent to the IKE proxy server 204 (digital signature issuance apparatus). The initiator 206 has an arrangement as shown in FIG. 3. The initiator 206 comprises the CPU (generation means) 303 which generates the data HASH_I and the network interface (communication means) 301 which sends the data HASH_I to the IKE proxy server 204 (digital signature issuance apparatus). The CPU 303 generates a key (encryption key shared with the responder 209) and HASH_I (data), on the basis of data exchanged with the responder (communication partner) 209 for key generation. The IKE proxy server 204 receives HASH_I (data) from the initiator (second apparatus) 206 which performs cryptographic communication with the responder (first apparatus) 209. The IKE proxy server 204 is a digital signature issuance apparatus which issues a digital signature for the initiator (second apparatus) 206 which performs cryptographic communication with the responder (first apparatus) 209.

The IKE proxy server 204 receives HASH_I (step S623). In step S611, the IKE proxy server 204 calculates, a digital signature for HASH_I (hash value) and IP_I (the IP address currently used by the initiator 206). IP_I is an IPv6 address currently used by the initiator and has been being monitored by the IKE proxy server 204 from step S603. The IKE proxy server 204 generates a digital signature SIG_S for data obtained by concatenating HASH_I and IP_I. The IKE proxy server 204 comprises a network interface (communication means) 302 which communicates with the initiator 206 and the CPU (generation means) 303 which generates, using a private key, the digital signature SIG_S for the data HASH_I received from the initiator 206 and the address IP_I used by the initiator 206.

In step S612, the IKE proxy server 204 sends CERT_S (certificate of the public key corresponding to the private key used for the digital signature) and SIG_S to the initiator 206. CERT_S denotes the public-key certificate of the IKE proxy server 204. The IKE proxy server 204 sends the certificate CERT_S of the public key corresponding to the private key and the generated digital signature SIG_S to the initiator 206. The public-key certificate CERT_S contains the IP address used by the IKE proxy sever (apparatus which has a public key and private key) 204, the public key, and information defining that the apparatus in question is a signature issuance apparatus. The initiator 206 receives, by the network interface 301, the digital signature SIG_S issued by the IKE proxy server (digital signature issuance apparatus) 204 for the generated data HASH_I and the address IP_I currently used by the responder (communication device) 209.

In step S613, the initiator 206 encrypts IDii, the public-key certificate CERT_S, and the digital signature SIG_S using the encryption key shared by the responder 209 and sends them to the responder 209. The CPU 303 of the initiator 206 encrypts the digital signature SIG_S (and the public-key certificate CERT_S) using the key (encryption key shared with the responder 209). The initiator 206 sends the digital signature SIG_S (and CERT_S) to the responder (communication partner) 209 through the network interface 301.

In step S614, the responder 209 decrypts the received data using the encryption key shared with the initiator 206. The responder 209 confirms the validity of CERT_S using the public key of the CA. The responder 209 also confirms the validity of the public key of the IKE proxy server 204 contained in CERT_S, the IPv6 global address of the IKE proxy server 204, and that the apparatus in question is the IKE proxy server.

Then, the responder 209 calculates HASH_I. The responder 209 confirms using the public key of the IKE proxy server 204 that the received SIG_S is a signature of the IKE proxy server 204 for HASH_I and a destination address IP_I' (the destination address of SA in S602 and y_r and Nr in S607) used to communicate with the initiator 206. The responder 209 also confirms that the subnet prefix (/64) of the IPv6 global address of the IKE proxy server 204 is the same as the subnet prefix (/64) of the IP_I. By confirming using a certificate of the IKE proxy server 204 used in IKE which is performed by the IKE proxy server 204 by proxy that the IP address of the apparatus 206 which performs IPsec communication is certified by the IKE proxy server 204 which is different from the apparatus 206, the responder 209 serving as a communication partner of the apparatus 206 can confirm the validity of the IP address currently used by the apparatus 206. When the confirmation is successfully complete, the responder 209 calculates HASH_R and generates a signature SIG_R corresponding to HASH_R.

In step S615, the responder 209 encrypts IDir, CERT_R, and SIG_R using the encryption key shared with the initiator 206 and sends them to the initiator 206.

In step S616, the initiator 206 receives the data from the responder 209 and decrypts the received data using the encryption key shared with the responder 209. The initiator 206 confirms the validity of the CERT_R using the public key of the CA, confirms the validity of the public key of the responder 209 contained in CERT_R, and confirms that the FQDN or IPv6 address contained in CERT_R is equal to that used at the start of step S601. The initiator 206 calculates HASH_R and confirms using the public key of the responder 209 that SIG_R is a signature of the responder 209 for HASH_R.

With the above-mentioned operation, phase 1 of IKE ends, and ISAKMP SA is established/set between the initiator and the responder. After that, phase 2 is performed, as described above, IPsec SA is set, and IPsec communication is performed.

When the IKE proxy server 204 detects impersonation of another node as the initiator, it cancels processes after the detection. The processes to be canceled includes transmission of the server-aided computation result Z to the initiator 206 (S604), transmission of the server-aided computation result Z' to the initiator (step S609), and transmission of CERT_S and SIG_S to the initiator 206 (step S612). When the host 204 which is different from the apparatus 206 that performs IPsec communication and which is connected to the same link as the apparatus 206 monitors the IP address of the apparatus 206, the behavior of another apparatus of posing as the apparatus 206 using the IP address to be used by the apparatus 206 can be detected using data on the link layer.

In this embodiment as well, the IKE proxy server 204 performs server-aided computation of a Diffie-Hellman public-key distribution scheme and monitors the correspondence between the IP address currently used by the apparatus and the apparatus. The IKE proxy server 204 generates a digital signature for data HASH generated by the apparatus performing IKE (initiator 206) and the IP address currently used by the apparatus 206 and issues the digital signature to the apparatus 206. The validity of the digital signature is confirmed by a public-key certificate in which execution of monitoring is described. While monitoring the IP address used by the apparatus 206 performing IKE, the IKE proxy server 204 performs server-aided computation of a Diffie-Hellman public-key distribution scheme in IKE (Internet Key Exchange) in accordance with a request from the apparatus 206 and generates and issues a digital signature for HASH and the IP address of the apparatus 206. The apparatus 206 performing IKE sends the issued signature to the IKE communication partner (responder 209). The IKE communication partner 209 confirms the validity of the address used by the apparatus 206 using the signature. The apparatus 206 authenticates the IKE communication partner 209 using the signature of the IKE communication partner 209.

Preferred embodiments of the present invention have been described. The present invention, however, is not limited to the embodiments. For example, in the second and third embodiments, a single apparatus performs server-aided computation and generation of a digital signature. Separate apparatuses may perform these operations.

For example, the default gateway 202 may perform server-aided computation while the host 204 may generate a digital signature. In this example, in FIG. 1, the host 206 performs communication in steps S110 and S112 not with the default gateway 202 but with the host 204.

Alternatively, the host 204 may perform server-aided computation while the default gateway 202 may generate a digital signature. In this example, in FIG. 6, the host 206 performs communication in steps S610 and S612 not with the host 204 but with the default gateway 202.

Alternatively, server-aided computation and digital signature generation may be divided among two nodes on the link 207 other than the default gateway 202 (router), and the nodes may perform their own portions. In this example, in FIG. 6, the host 206 performs communication in steps S610 and S612 with a host other than the host 204.

Note that the responder may ask the IKE proxy server to perform signature generation (and public-key certificate generation and server-aided computation).

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-013093 filed on Jan. 21, 2004, which is hereby incorporated by reference herein.

What is claimed is:

1. A digital signature issuance method for issuing, in a digital signature issuance apparatus, a digital signature to a second apparatus which communicates with a first apparatus, comprising the steps of:
  receiving a parameter from the first apparatus;
  computing data, based on the parameter received from the first apparatus, for use by the second apparatus to share secret data for encryption with the first apparatus;
  issuing a result of the computation to the second apparatus;
  receiving, from the second apparatus, data which is calculated by the second apparatus based on the shared secret data;
  generating a digital signature, using a private key, for both an address of the second apparatus and the data which is calculated by the second apparatus based on the shared secret data, wherein the digital signature is generated using the private key so as to be usable by the first apparatus for authentication based on the shared secret data and the address of the second apparatus used to share the secret data; and issuing to the second apparatus, the digital signature generated in the generating step and a public key certificate, wherein the public key certificate includes an address of the digital signature issuance apparatus, a public-key corresponding to the private key used for generating the digital signature, and information defining that the digital signature issuance apparatus generates a digital signature.

2. The method according to claim 1, wherein in the computing step, while monitoring an IP address used by the second apparatus executing IKE (Internet Key Exchange), computation of a Diffie-Hellman public-key distribution scheme in IKE is executed in response to a request from the second apparatus to derive the secret data.

3. The method according to claim 1, wherein in the generating step, a digital signature is generated using a hash value generated by the second apparatus and the address used by the second apparatus.

4. The method according to claim 1, wherein the method is executed on a default gateway of the second apparatus.

5. A non-transitory computer-readable storage medium storing a digital signature issuance program for causing a digital signature issuance apparatus to issue a digital signature to a second apparatus which communicates with a first apparatus, the program comprising code for performing the steps of:

receiving a parameter from the first apparatus;

computing data, based on the parameter received from the first apparatus, for use by the second apparatus to share secret data for encryption with the first apparatus;

issuing a result of the computation to the second apparatus;

receiving, from the second apparatus, data which is calculated by the second apparatus based on the shared secret data generating a digital signature, using a private key, for both an address of the second apparatus and the data which is calculated by the second apparatus based on the shared secret data, wherein the digital signature is generated using the private key so as to be usable by the first apparatus to perform authentication based on the shared secret data and the address of the second apparatus used to share the secret data; and issuing, to the second apparatus, the digital signature generated in the generating step and a public key certificate, wherein the public key certificate includes an address of the digital signature issuance apparatus, a public-key used for generating the digital signature, corresponding to the private key, and information defining that the digital signature issuance apparatus generates a digital signature.

6. The non-transitory computer-readable storage medium storing a digital signature issuance program according to claim 5, wherein in the computing step, while monitoring an IP address used by the second apparatus executing IKE (Internet Key Exchange), computation of a Diffie-Hellman public-key distribution scheme in IKE is executed in response to a request from the second apparatus to derive the secret data.

7. The non-transitory computer-readable storage medium storing a digital signature issuance program according to claim 5, wherein in the generating step, the digital signature is generated using a hash value generated by the second apparatus and the address of the second apparatus.

8. A digital signature issuance apparatus for issuing a digital signature to a second apparatus which communicates with a first apparatus, comprising:

a receiving unit configured to receive a parameter from the first apparatus;

a computing unit configured to compute data, based on the parameter received from the first apparatus, for use by the second apparatus to share secret data for encryption with the first apparatus;

an issuing unit configured to issue a result of the computation to the second apparatus;

a receiving unit configured to receiving, from the second apparatus, data which is calculated by the second apparatus based on the shared secret data and a generating unit configured to generate a digital signature, using a private key, for both an address of the second apparatus and the data which is calculated by the second apparatus based on the shared secret data, wherein the digital signature is generated using the private key so as to be usable by the first apparatus to perform authentication based on the shared secret data and the address of the second apparatus used to share the secret data, wherein the issuing unit issues, to the second apparatus, the digital signature generated by the generating unit and a public key certificate, the public key certificate including an address of the digital signature issuance apparatus, a public-key corresponding to the private key used for generating the digital signature, and information defining that the digital signature issuance apparatus generates a digital signature, and wherein said digital signature issuance apparatus comprises a processor configured to function as the computing unit, the generating unit, and the issuing unit.

9. The apparatus according to claim 8, wherein said executing unit executes computation of a Diffie-Hellman public-key distribution scheme in IKE (Internet Key Exchange) in response to the request from the second apparatus to derive the secret data, while monitoring an IP address used by the second apparatus executing IKE.

10. The apparatus according to claim 8, wherein said generating unit generates a digital signature using a hash value generated by the second apparatus and the address used by the second apparatus.

11. The apparatus according to claim 8, wherein the digital signature issuance apparatus is a default gateway of the second apparatus.

12. The digital signature issuance method according to claim 1, wherein the digital signature generated in the generating step and the public key certificate are issued to the second apparatus in the issuing step, and wherein the public key certificate includes an IP address of the digital signature issuance apparatus, the public-key, and the information.

13. The non-transitory computer-readable storage medium storing a digital signature issuance program according to claim 5, wherein the digital signature generated in the generating step and the public key certificate are issued to the second apparatus in the issuing step, and wherein the public key certificate includes an IP address of the digital signature issuance apparatus, the public-key, and the information.

14. The digital signature issuance apparatus according to claim 8, wherein the issuing unit issues, to the second apparatus, the digital signature generated by the generating unit and the public-key certificate, wherein the public key certificate includes an IP address of the digital signature issuance apparatus, the public-key, and the information.

* * * * *